United States Patent [19]
Nishiyama et al.

[11] Patent Number: 5,811,197
[45] Date of Patent: Sep. 22, 1998

[54] POLYESTER FILM HAVING LOW ELECTROSTATIC AND HIGH ADHESION PROPERTIES

[75] Inventors: Masanori Nishiyama; Makoto Handa; Toshifumi Osawa; Hideaki Watanabe, all of Sagamihara, Japan

[73] Assignee: Teijin Limited, Osaka, Japan

[21] Appl. No.: 818,450

[22] Filed: Mar. 17, 1997

[51] Int. Cl.⁶ .................................................. B32B 27/06
[52] U.S. Cl. ............................................ 428/480; 528/176
[58] Field of Search .............................. 528/176; 428/480

[56] References Cited

U.S. PATENT DOCUMENTS 4,605,591  8/1986  Nose et al. ............................. 428/332

FOREIGN PATENT DOCUMENTS 7144361  6/1995  Japan .
7227948  8/1995  Japan .

*Primary Examiner*—Terressa Mosley
*Attorney, Agent, or Firm*—Sughrue, Mion, Zinn, Macpeak & Seas, PLLC

[57] ABSTRACT

A polyester film having low electrostatic and high adhesion properties and having formed on at least one side thereof a primer layer which has a softening point of 100° to 170° C. and essentially consists of (1) water-dispersible polyester resin containing, as a copolymer component, a sulfonic acid metal salt group-containing compound in an amount of 0.01 mol % or more and less than 0.5 mol % of the whole dicarboxylic acid compound (component A) and (2) polyethylene oxide-monoalkyl ether or a mixture of the same and a polyethylene oxide-polypropylene oxide block copolymer (component B). This adherent polyester film has low electrostatic properties and high heat resistance and is useful as a base film for a magnetic recording medium.

15 Claims, 1 Drawing Sheet

POLYESTER FILM HAVING LOW ELECTROSTATIC AND HIGH ADHESION PROPERTIES

DETAILED DESCRIPTION OF THE INVENTION

1. Field of the Invention

This invention relates to a polyester film having low electrostatic and high adhesion properties and, more specifically, to a polyester film having on the surface thereof a primer layer which is excellent in heat resistance and coating properties and has low electrostatic and high adhesion properties.

2. Prior Art

A polyester film is used for a wide field of application (such as magnetic recording media, graphic materials, printing materials, packing materials, electronic materials and the like) due to its excellent chemical and physical properties. However, the polyester film has high crystallinity and must be provided with surface characteristic properties to meet its application purpose in order to develop sufficient film characteristics.

As means for providing adhesion properties to the polyester film, the formation of an adherent layer (primer layer) by applying an aqueous solution, such as an aqueous dispersion, of an adherent polyester resin has been proposed and implemented. For example, it is known that the primer layer is formed by applying an aqueous solution of a hydrophilic polyester resin having not less than 0.5 mol % of a sulfonic acid salt group introduced into the molecule of the polymer. However, this hydrophilic polyester resin has defects with a low secondary transition point (Tg) and low resistance to wet heat. And, a surfactant is further added to stabilize the aqueous solution or a coating step, but heat resistance is deteriorated by this surfactant and in consequence, the polyester resin has poor coating properties.

It is effective to introduce a stiff component so as to increase the secondary transition point (Tg) of the polyester resin. In this case, adhesion properties are liable to lower and hydrophilic nature becomes low with the result of a reduction in the solubility of the resin.

JP-A 63-115747 (the term "JP-A" as used herein means an "unexamined published Japanese patent application") discloses a transparent thermoplastic resin film laminate having excellent antistatic properties, which has formed on at least one side thereof a primer layer comprising a mixture of (A) a water-insoluble polyester copolymer comprising a mixed dicarboxylic acid component containing a sulfonic acid metal salt group-containing dicarboxylic acid in an amount of 0.5 to 15 mol % based on the whole dicarboxylic acid component and a glycol component and (B) a copolymer represented by the following formula:

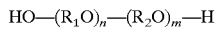

HO—(R$_1$O)$_n$—(R$_2$O)$_m$—H wherein n and m are an integer of 6 to 1,200, R$_1$ and R$_2$ are an alkylene group having 1 to 4 carbon atoms or arylene group, with a proviso that the R$_1$ and R$_2$ are not the same and one of them is an alkylene group having 3 or more carbon atoms or arylene group.

However, it cannot be said that this film laminate has satisfactory antistatic properties, and the above copolymer is liable to have low adhesion properties due to a low HLB (hydrophilic-lipophilic balance).

It is therefore a first object of the present invention to provide a polyester film having a primer layer which has low electrostatic and high adhesion properties.

It is a second object of the present invention to provide a polyester film having a primer layer which is excellent in heat resistance.

It is a third object of the present invention to provide a primer which can form an uniform coating film on the surface of a polyester film and has excellent coating processabolity.

It is another object of the present invention to provide a polyester film having a primer layer which is excellent in running properties under contact with a heating roll.

It is still another object of the present invention to provide an adherent polyester film suitable for use in a magnetic recording medium.

According to studies conducted by the inventors of the present invention, it was found that the above objects of the present invention can be attained by a polyester film having low electrostatic and high adhesion properties, which has formed on at least one side thereof a primer layer having a softening point of 100° to 170° C. and essentially consisting of (1) a water-dispersible polyester resin (component A) containing, as a copolymer component, a sulfonic acid metal salt group-containing compound in an amount of 0.01 mol % or more but less than 0.5 mol % of the whole dicarboxylic acid compound and (2) polyethylene oxide-monoalkyl ether or a mixture of the same and a polyethylene oxidepolypropylene oxide block copolymer (component B).

BRIEF DESCRIPTION OF THE INVENTION

FIG. 1 is a device wherein reference numeral 1 denotes an unwinding reel, 2 a tension contoller, 3, 5, 6, 8, 9 and 11 free rollers, 4 a tension tensiometer (inlet), 7 a fixed pin made of stainless steel SUS304 (outer diameter: 5 mmϕ), 10 a tension tensiometer (outlet), 12 a guide roller and 13 a take-up reel.

The present invention is described in detail hereinafter.

In the present invention, the polyester constituting a polyester film as a base film is a polyester comprising an aromatic dicarboxylic acid as a main acid component and an aliphatic glycol as a main glycol component. The polyester is substantially linear and has a film-forming property, particularly a property of film-forming by melt molding.

Illustrative examples of the aromatic dicarboxylic acid compound forming the polyester include terephthalic acid, naphthalenedicarboxylic acid, isophthalic acid, diphenoxy ethane dicarboxylic acid, diphenyl dicarboxylic acid, diphenyl ether dicarboxylic acid, diphenyl sulfone dicarboxylic acid, diphenyl ketone dicarboxylic acid, anthracene dicarboxylic acid and the like.

Illustrative examples of the aliphatic glycol component include polymethylene glycol having 2 to 10 carbon atoms such as ethylene glycol, trimethylene glycol, tetramethylene glycol, pentamethylene glycol, hexamethylene glycol and decamethylene glycol; alicyclic diols such as cyclohexane dimethanol; and the like.

In the present invention, polyesters comprising alkylene terephthalate and/or alkylene naphthalate as main constituent(s) are preferably used as the polyester.

Of these polyesters, particularly preferred are polyethylene terephthalate, polyethylene-2,6-naphthalate and a copolyester comprising terephthalic acid and/or 2,6-naphthalene dicarboxylate in an amount of not less than 80 mol % of the whole dicarboxylic acid compound and ethylene glycol in an amount of not less than 80 mol % of the whole glycol component. Not more than 20 mol % of the whole acid component may be the above aromatic dicarboxylic acids other than terephthalic acid and/or 2,6- naphthalene dicarboxylic acid; aliphatic dicarboxylic acids such as adipic acid and sebacic acid; alicyclic dicarboxylic acids such as cyclohexane-1,4-dicarboxylate; and the like. Not more than 20 mol % of the whole glycol component may be the above glycols other than ethylene glycol; aromatic diols such as hydroquinone, resorcin and 2,2-bis(4-hydroxyphenyl)propane; aliphatic diols having an aromatic ring such as 1,4-dihydroxydimethyl benzene; polyalkylene glycol (polyoxyalkylene glycol) such as polyethylene glycol, polypropylene glycol and polytetramethylene glycol; and the like.

The polyester used in the present invention includes copolymers copolymerized with an oxycarboxylic acid component such as an aromatic oxyacid exemplified by hydroxybenzoic acid or an aliphatic oxyacid typified by ω-hydroxycaproic acid in an amount of not more than 20 mol % of the total amount of the dicarboxylic acid components and the oxycarboxylic acid components.

The polyester used in the present invention also includes a copolymer comprising a polycarboxylic acid component or a polyhydroxy compound component having 3 or more functional groups, such as trimellitic acid or pentaerythritol, in an amount that it is substantially linear, e.g., in an amount of not more than 2 mol % of the whole acid component.

The polyester is known per se and can be produced by a known method per se. The polyester preferably has an intrinsic viscosity, measured at 35° C. in an o-chlorophenol solution, of about 0.4 to 0.9.

Inert inorganic particles or crosslinked polymer particles may be contained alone or in desired combination in the polyester as a lubricant in the present invention. Preferred examples of the inert inorganic particles include kaolin, calcium carbonate, silica, aluminum oxide (alumina) and the like. Preferred examples of the crosslinked polymer particles include crosslinked silicone resin, crosslinked polystyrene resin, crosslinked acryl resin and the like. These particles are preferably added to a reaction system as a slurry in a glycol when a polyester is produced, for example, at a desired stage during an ester exchange reaction or during a polycondensation reaction when an ester exchange method is used, or at a desired stafe when a direct polymerization method is used. The average particle size of the lubricant is preferably 0.005 to 2 $\mu$m, more preferably 0.01 to 1.8 $\mu$m. The amount of the lubricant added is preferably 0.01 to 2% by weight, more preferably 0.03 to 1.5% by weight.

The polyester film in the present invention is preferably a biaxially oriented film. The thickness of the film is preferably 3 to 20 $\mu$m. Further, the polyester film preferably has a Young's modulus in biaxial directions of not less than 450 kg/mm$^2$ and not more than 2,000 kg/mm$^2$.

Although the production method of the polyester film is not particularly limited, the polyester film can be produced by any conventionally known method.

In the present invention, the primer layer formed on one side or both sides of the polyester film as a base film essentially consists of the following components A and B:

component A: a water-dispersible polyester resin containing a sulfonic acid metal salt group-containing compound in an amount of 0.01 mol % or more and less than 0.5 mol % of the whole dicarboxylic acid compound.

component B: (i) polyethylene oxide-monoalkyl ether (component B-1) or (ii) a mixture of the component B-1 and a polyethylene oxide-propylene oxide block copolymer (component B-2).

The above water-dispersible polyester resin (component A) in the primer layer of the present invention contains as a copolymer component a sulfonic acid metal salt group-containing compound in an amount of 0.01 mol % or more but less than 0.5 mol %, preferably 0.04 to 0.3 mol %, of the whole dicarboxylic acid compound. If the copolymerization proportion of this compound is less than 0.01 mol %, the water dispersibility of the resin and the stability of a coating solution will become extremely bad. If it is 0.5 mol % or more, the resulting film will have high electrostatic properties. Consequently, low electrostatic properties which is the characteristic feature of the polyester film of the present invention cannot be obtained.

Preferred examples of the sulfonic acid metal salt group-containing compound include dicarboxylic acids having a sulfonic acid salt group (such as sodium sulfonate group, lithium sulfonate group, potassium sulfonate group, ammonium sulfonate group, polyalkyl phosphine sulfonate group and the like). Specific examples thereof include 5-sodium sulfoisophthalate, 5-potassium sulfoisophthalate, 5-sodium sulfoterephthalate, 5-potassium sulfoterephthalate and the like.

Preferred examples of the dicarboxylic acid compound constituting the above water-dispersible polyester resin (A) include terephthalic acid, isophthalic acid, phthalic acid, 2,6-naphthalenedicarboxylic acid, hexahydroterephthalic acid, 4,4'-diphenyldicarboxylic acid, phenylindanedicarboxylic acid, adipic acid, sebacic acid, trimellitic acid, and the like. The water-dispersible polyester resin containing 2,6-naphthalenedicarboxylic acid in an amount of 30 to 100 mol %, preferably 35 to 90 mol % of the whole dicarboxylic acid compound provides high heat resistance to the primer layer.

Preferred examples of the glycol component constituting the polyester resin as component A include ethylene glycol, diethylene glycol, neopentyl glycol, 1,4-butanediol, 1,6-hexanediol, 1,4-cyclohexane dimethanol, dimethylolpropionic acid, glycerin, trimethylolpropane, adduct of bisphenol A with alkylene oxide, and the like. They may be used in combination of two or more.

The above water-dispersible polyester resin (component A) can be produced by a conventionally known method. The number average molecular weight of the water-dispersible polyester resin (component A) is preferably 3,000 to 30,000, more preferably 5,000 to 15,000. Although the water-dispersible polyester resin (A) is used as a water dispersion to prepare a coating solution, its average particle size is preferably several tens of nm.

Preferred examples of the component A include water-dispersible polyesters comprising dicarboxylic acid compounds consisting of 30 to 99.06 mol % of 2,6-naphthalenedicarboxylic acid, 0 to 69.7 mol % of isophthalic acid, and 0.04 to 0.3 mol % of 5-sodium sulfoisophthalate and glycol components consisting of 40 to 100 mol % of ethylene glycol and 0 to 60 mol % of an adduct bisphenol A with propylene oxide (1 to 10 mol adduct).

The component B constituting the primer layer of the present invention is component B-1 or a mixture of component B-1 and component B-2.

The component B-1 is polyethylene oxide-monoalkyl ether, preferably polyethylene oxide-monoalkyl ether in which the monoalkyl ether has 8 to 18 carbon atoms in its alkyl part. The component B-1 preferably has 5 to 15 ethylene oxide recurring units. The component B-1 is an ether compound represented by the following formula (1).

RO—(C$_2$H$_4$O)$_q$—H       (1)

wherein R is an alkyl group having 8 to 18 carbon atoms and q is a numeral of 3 to 15.

In the above formula (1), the alkyl group represented by R is preferably a primary or secondary alkyl having 8 to 18 carbon atoms. Preferred examples of such alkyl include octyl, lauryl, myristyl, pentadecyl, stearyl and the like, of which an alkyl having 12 to 14 carbon atoms is particularly preferred. The q is preferably a numeral of 5 to 9. In the above formula (1), the alkyl group represented by R functions as a lipophilic nature-providing component and the ethylene oxide unit $[-(C_2H_4O)_q-H]$ functions as a hydrophilic nature-providing component. Therefore, depending on the carbon number of an alkyl group, generally speaking, ethylene oxide having a smaller degree of addition polymerization (in other words, q is a small numeral) has higher lipophilic nature and ethylene oxide having a larger degree of addition polymerization (in other words, q is a large numeral) has higher hydrophilic nature. An ether compound in which R is an alkyl group having 12 to 14 carbon atoms and q is a numeral of 5 to 9 is particularly preferred from a viewpoint of the balance between these natures.

As the component B can be used the above component B-1 alone. However, the component B-1 may be used in admixture with a polyethylene oxide-polypropylene oxide block copolymer (component B-2). The polyethylene oxide-polypropylene oxide block copolymer as the component B-2 is preferably a block copolymer having polyethylene oxide units represented by the following general formula (2) at both termini.

$$HO-(C_2H_4O)_n-(C_3H_6O)_m-(C_2H_4O)_p-H \qquad (2)$$

In the above formula (2), m is 20 to 80, (n+p) is preferably 80 to 600, more preferably 100 to 600, and n and p are each preferably 20 or more.

Although the proportions of polyethylene oxide units and polypropylene oxide units in the polyethylene oxide-polypropylene oxide block copolymer (component B-2) can be adjusted to desired values, it is preferred that the proportion of the polyethylene oxide units be in the range of 50 to 90% by weight, more preferably 70 to 86% by weight. The number average molecular weight of the block copolymer is preferably 5,000 to 30,000.

The contents of the component A and the component B in the primer layer of the present invention are preferably 93 to 70% by weight and 7 to 30% by weight, particularly preferably 90 to 80% by weight and 10 to 20% by weight, respectively. If the amount of the component A is more than 93% by weight, coating film-forming properties will be poor, while if it is less than 70% by weight, the adhesion properties of the primer layer will lower. If the amount of the component B is less than 7% by weight, coating film-forming properties will lower and electrostatic properties will be insufficient. On the other hand, if the amount of the component B is more than 30% by weight, the adhesion, anti-blocking properties and heat resistance of the obtained film will deteriorate disadvantageously.

The component B in the primer layer of the present invention is the component B-1 alone or a mixture of the component B-1 and the component B-2. Therefore, the ratio of the component B-1 to the component B-2 is 10:0 to 2:8, preferably 10:0 to 1:2.

In the present invention, the primer layer formed on the surface of a polyester base film has a thickness of 0.005 to 1 μm, preferably 0.01 to 0.7 μm. The surface roughness of the primer layer is 0.002 to 0.02 μm, preferably 0.004 to 0.01 μm in terms of center line average roughness (Ra). If the center line average roughness (Ra) of the surface of the primer layer is less than 0.002 μm, handling properties in the film processing step will become worse, while if it is more than 0.02 μm, electromagnetic conversion characteristics will deteriorate disadvantageously when the film is used in a magnetic recording material.

Studies conducted by the present inventors revealed that there are small differences in the characteristic properties of the obtained adherent polyester films depending on the ratio of the component A to the component B and depending on which is used as the component B, the component B-1 alone or a mixture of the component B-1 and the component B-2. Desirable properties out of workability or heat resistance can be achieved by making use of this difference when the film is used as a magnetic recording medium.

In other words, when a primer layer comprising 93 to 70% by weight of the component A and 7 to 30% by weight of the component B-1 alone as the component B is formed, an adherent polyester film having a running friction coefficient at the time of heating at 65° and 105° C. of 0.05 to 0.75 is obtained. Particularly preferably, when the primer layer comprises 90 to 75% by weight of the component A and 10 to 25% by weight of the component B-1, an adherent polyester film having a running friction coefficient at the time of heating at 65° and 105° C. of 0.10 to 0.65 is obtained. Thus, when the component B-1 is used as the component B and mixed with the component A in the above ratio, a film having a small running friction coefficient at the time of heating at 65° and 105° C. is obtained. Therefore, a polyester film which can be easily handled at a high speed is obtained.

Meanwhile, when a primer layer is formed using the components B-1 and B-2 as the component B, that is, when a primer layer comprises the component A, the component B-1 and the component B-2 in proportions of 93 to 80% by weight, 10 to 2% by weight and 15 to 5% by weight, respectively, an adherent polyester film having a relatively high softening point of 140° to 170° C. and excellent heat resistance is obtained. In this case, when the proportions of the component A, the component B-1 and the component B-2 are 90 to 80% by weight, 7 to 3% by weight and 13 to 7% by weight, respectively, the obtained primer layer has a softening point of 146° to 165° C. which is more preferred and is excellent in adhesion and coating processsabolity.

The primer layer of the present invention is provided by applying a coating solution to an unstretched polyester film, a stretched polyester film or a biaxially oriented film and then drying the film. This coating is applied on one side or both sides of a film. Of the above films, coating is preferably carried out on a monoaxially oriented film which has been stretched in a longitudinal direction. In this case, after coating, the film can be stretched in a transverse direction and further re-stretched in a longitudinal or transverse direction as the case may be. Stretching itself can be carried out under conventionally known conditions by a conventionally known method. For instance, the film is stretched at a stretch ratio of 2.5 or more, preferably 3.0 or more, in biaxial directions, or at an area stretch ratio of 8 or more, preferably 8 to 30.

The solid content of the coating solution (primer coating solution) is preferably 0.5 to 30% by weight, more preferably 1 to 15% by weight. This coating solution may contain other components such as inert fine particles, heat stabilizer and the like as desired, in addition to the water-dispersible polyester resin (component A), polyethylene oxide-monoalkyl ether (component B-1) and polyethylene oxide-polypropylene oxide block copolymer (component B-2).

The thus obtained laminate polyester film having a primer layer has excellent coating and adhesion properties, heat resistance and low electrostatic properties and is particularly useful as a base material for a magnetic recording medium.

EXAMPLES

The following examples are given to further illustrate the present invention. Values of characteristic properties were measured in accordance with the following methods.

1. Adhesion Properties

The following coating for evaluation is applied onto a polyester film (the surface of a primer layer) with a Meyer bar to ensure that the thickness of the film after drying becomes about 4 μm, and then dried at 100° C. for 3 minutes. Thereafter, the film is aged at 60° C. for 24 hours and then, a 12.7 mm-wide and 15 cm-long piece of Scotch Tape No. 600 (a product of 3M Co.) is affixed to the film in such a manner that air does not enter between the tape and the film. A manual load roll specified in JIS C2701 (1975) is rolled over the tape to firmly adhere it to the film, and is then cut to a tape width. The film is peeled from the tape at an angle of 180° to measure its peel strength.
○: 50 g or more
Δ: 30 g or more but less than 50 g
X: less than 30 g
(coating for evaluation)
In terms of solid content,
(1) 25 parts by weight of an urethane resin (Nipporan 2304 of Nippon Polyurethane Co.),
(2) 50 parts by weight of a vinyl chloride-vinyl acetate resin (S-Lec A of Sekisui Chemical Co. Ltd.),
(3) 1 part by weight of a dispersant (Resion P of Riken Vitamin Co. Ltd.), and
(4) 500 parts by weight of a magnetic agent (CTX-860 of Toda Chemical Co. Ltd.)
are dissolved in a mixture solvent of methyl ethyl ketone, toluene and cyclohexanone to prepare a 40 wt % solution and dispersed with a sand grinder for 2 hours. Thereafter, 25 parts by weight (in terms of solid content) of a crosslinking agent (Coronate L) is added and stirred well to obtain a magnetic coating.

2. Young's Modulus

A film is cut into a 10 mm-wide and 150 mm-long sample piece which is then pulled at an interchuck interval of 100 mm using an Instron type universal tensile tester, at a pulling rate of 10 mm/min and a charting speed of 500 mm/min. A Young's modulus is calculated from a tangent of a rising portion of the obtained load-elongation curve.

3. Center Line Average Roughness (Ra)

A chart (film surface roughness curve) is stretched under such conditions as a needle radius of 2 μm and a tracer load of 30 mg using a tracer type surface roughness meter (SE-3 FAT) of Kosaka Laboratories Ltd. A measured length L portion in the direction of a center line thereof is extracted from the film surface roughness curve, and when the center line of the extracted portion is taken as X axis, the direction of vertical magnification as Y axis and the roughness curve is expressed by Y=f(X), Ra [μm] given by the following equation is defined as the center line average roughness of the surface of a film.

$$Ra = \frac{1}{L}\int_0^L |f(X)|dx$$

4. Running friction coefficient ($\mu k$) at the time of heating

This is measured in the following manner, using a device shown in FIG. 1. In FIG. 1, reference numeral 1 denotes an unwinding reel, 2 a tension controller, 3, 5, 6, 8, 9 and 11 free rollers, 4 a tension tensiometer (inlet), 7 a fixed pin made of stainless steel SUS304 (outer diameter: 5 mmφ), 10 a tension tensiometer (outlet), 12 a guide roller and 13 a take-up reel.

The primer layer side of a ½-inch wide cut polyester film is brought into contact with the fixed pin 7 (surface roughness: 10 nm) heated at 65° C. or 105° C. by a heater at an angle of 90°θ [θ=(90/180)π (radian)] and moved (friction) at a speed of 2 m/min. A tension $T_1$ at the inlet is adjusted to 30 g with the tension controller 2 and the tension ($T_1$:g) at the outlet after the film is allowed to run 40 m is detected. When the maximum tension is represented by $T_2$ (g), the running friction coefficient ($\mu k$) is calculated from the following equation.

$$\mu k = 1/\theta \cdot \log \cdot T_2/30$$

5. Electrostatic Properties

A polyester film (10 μm×500 mm×3,000 mm) is rewound at a rate of 150 m/min in an atmosphere of 23° C. ×75% RH and the peel electrostatic amount of the obtained roll is measured using the Model-203 digital electric measuring instrument of Hugle Electronics Co. Ltd.
○: less than 2.5 kv
Δ: 2.5 to 5.0 kv
X: more than 5.0 kv 6. Softening Point (Ring and Ball Method)

A dry-solid product of a coating solution for forming a primer layer is prepared and is measured for its softening point in accordance with JIS K-3531-1960. Glycerin is used as a heating bath and heated at an elevating-temperature rate of about 5° C./min.

7. Heat Resistance

A polyester film is caused to run such that the primer layer surface thereof is in contact with a heating roll heated at 110° C. and having a rotation surface speed of 4 m/min at a nip pressure of 2 kg/cm², and the surface of the roll is evaluated after 40 minutes.
○: No foreign matter is observed on the surface of the roll.
Δ: A slight amount of foreign matter is observed on the surface of the roll.
X: A large amount of foreign matter is observed on the surface of the roll.

8. Evaluation of Coating Properties

When a primer coating solution is applied to a film, the coated surface of the film is observed to evaluate visually whether the coating is applied uniformly.
○: No spots or stripes are observed.
Δ: A small number of spots or stripes are observed.
X: A large number of spots or stripes are observed.

9. Coating Solution Stability

A primer coating solution is kept at 60° C. for 3 days and whether a precipitate is produced is observed.
○: No precipitate is observed.
Δ: A slight amount of precipitate is observed.
X: A large amount of precipitate is observed.

Example 1

An unstretched sheet of polyethylene terephthalate having an intrinsic viscosity of 0.62 was stretched to 2.3 times in a longitudinal direction, and then a 2 wt % aqueous solution of a composition comprising 85% by weight of a water-dispersible polyester resin (number average molecular weight: about 23,500) consisting of a 2,6-naphthalenedicarboxylic acid component (40 mol %), isophthalic acid component (59.95 mol %), 5-Na sulfoisophthalate component (0.05 mol %), ethylene glycol component (70 mol %), and adduct of bisphenol A with 4 mole propylene oxide (30 mol %) and 15 % by weight of polyethylene oxide-monoalkyl (mixture of alkyls having 12 to 14 carbon atoms) ether (number average molecular weight: about 500, alkyl group: mixture of alkyls having 12 to 14 carbon atoms) was applied to one side of the sheet with a roll coater. Thereafter, the sheet was stretched, while drying, to 3.7 times in a transverse direction and further re-stretched to 2.3 times in a longitudinal direction, and heat set at 220° C. to obtain a 10 μm-thick film. The film thickness of the primer layer was 0.015 μm. The film had a surface roughness Ra of 0.005 μm and a Young's modulus in a longitudinal direction of 830 kg/mm². The characteristic properties of the film are shown in Table 1.

Examples 2 and 3 and Comparative Examples 1 to 4

The procedure of Example 1 was repeated except that the component ratio of the coating composition was changed as shown in Table 1. Comparative Example 2 is the same as Example 2 except that a polyethylene oxide-polyoxypropylene copolymer was used as a surfactant in place of polyethylene oxide-monoalkyl ether. The characteristic properties of the obtained films are shown in Table 1.

5% by weight of polyethylene oxide-monoalkyl ether (number average molecular weight: about 500, alkyl group: mixture alkyl having 12 to 14 carbon atoms) (component B-1); and 12.5% by weight of a block copolymer comprising polyethylene oxide (80 wt %) and polypropylene oxide (20 wt %) (number average molecular weight: about 23,500) (component B-2) were used and fully blended with a water medium to prepare a primer aqueous coating solution having a solid content of 10% by weight.

Production of an adherent polyester film:

An unstretched sheet of polyethylene terephthalate having an intrinsic viscosity of 0.62 was stretched to 2.3 times in a longitudinal direction, and the above primer aqueous coating solution was applied to one side of the above sheet with a roll coater. Thereafter, the sheet was stretched, while drying, to 3.7 times in a transverse direction and further re-stretched

TABLE 1

| | | | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|---|
| Copolyester (component A) | Acid component (mol %) | Naphthalene-dicarboxylic acid | 40.00 | 40.00 | 40.00 | 40.00 | 40.00 | 50.00 | 50.00 |
| | | Isophthalic acid | 59.95 | 59.95 | 59.80 | 59.95 | 59.95 | 46.00 | 50.00 |
| | | Sulfoisophthalic acid | 0.05 | 0.05 | 0.20 | 0.05 | 0.05 | 4.00 | 0.00 |
| Surfactant (component B) | | | 15 | 10 | 10 | 0 | 10 | 10 | 10 |
| Adhesion properties | | | ○ | ○ | ○ | ○ | ○ | ○ | ○ |
| Softning point (°C.) | | | 120 | 128 | 126 | 148 | 128 | 119 | 134 |
| Friction coefficient (65° C.) | | | 0.62 | 0.60 | 0.63 | 0.60 | Running stopped | 0.71 | 0.62 |
| Friction coefficient (105° C.) | | | 0.34 | 0.33 | 0.34 | 0.31 | Running stopped | 0.39 | 0.32 |
| Electrostatic properties | | | ○ | ○ | ○ | ○ | X | X | ○ |
| Coating properties | | | ○ | ○ | ○ | X | ○ | ○ | X |
| Coating solution stability | | | ○ | ○ | ○ | ○ | ○ | ○ | Δ |

Ex.: Example
Comp. Ex.: Comparative Example

Example 4
Preparation of primer coating solution:

82.5% by weight of a water-dispersible polyester resin (component A) having a number average molecular weight of about 10,000 and comprising 40 mol % of a 2,6-naphthalenedicarboxylic acid component, 59.95 mol % of an isophthalic acid component, 0.05 mol % of a 5-Na sulfoisophthalate component, 70 mol % of an ethylene glycol component, and 30 mol % of a adduct of bisphenol A with 4 mole propylene oxide;

to 2.3 times in a longitudinal direction, and then heat set at 220° C. to obtain a 10 μm-thick film. The film thickness of the primer layer was 0.015 μm. The characteristic properties of the film are shown in Table 2.

Examples 5 to 7 and Comparative Examples 5 to 7

The procedure of Example 5 was repeated except that the amount of the polyester resin component was changed to 85% by weight and the ratio of the coating composition was changed as shown in Table 2. The characteristic properties of the obtained films are shown in Table 2.

TABLE 2

| | | | Ex. 4 | Ex. 5 | Ex. 6 | Ex. 7 | Comp. Ex. 5 | Comp. Ex. 6 | Comp. Ex. 7 |
|---|---|---|---|---|---|---|---|---|---|
| Composition of copolyester (component A) | Acid components (mol %) | 2,6-naphthalenedicarboxylic acid | 40 | 40 | 40 | 40 | 40 | 50 | 50 |
| | | Isophthalic acid (mol %) | 59.95 | 59.95 | 59.95 | 59.8 | 59.95 | 46 | 50 |
| | | 5-Na sulfoisophthalic acid (mol %) | 0.05 | 0.05 | 0.05 | 0.2 | 0.05 | 4 | 0 |
| | Glycol[1] components | EG (mol %) | 70 | 70 | 70 | 70 | 70 | 70 | 70 |
| | | BPA-P (mol %) | 30 | 30 | 30 | 30 | 30 | 30 | 30 |
| Component B | EOPO copolymer (wt. %): component B-2 | | 12.5 | 7.5 | 10 | 7.5 | 15 | 7.5 | 7.5 |
| | Polyethylene oxide-monoalkyl ether (wt %): component B-1 | | 5 | 7.5 | 5 | 7.5 | 0 | 7.5 | 7.5 |
| Adhesion properties | | | ○ | ○ | ○ | ○ | ○ | ○ | ○ |
| Softening point (°C.) | | | 152 | 147 | 154 | 145 | 164 | 138 | 153 |
| Heat resistance | | | ○ | ○ | ○ | ○ | ○ | Δ | ○ |
| Electrostatic properties | | | ○ | ○ | ○ | ○ | ○ | X | ○ |
| Coating properties | | | ○ | ○ | ○ | ○ | X | ○ | X |
| Coating solution stability | | | ○ | ○ | ○ | ○ | ○ | ○ | Δ |

TABLE 2-continued

|  | Ex. 4 | Ex. 5 | Ex. 6 | Ex. 7 | Comp. Ex. 5 | Comp. Ex. 6 | Comp. Ex. 7 |
| --- | --- | --- | --- | --- | --- | --- | --- |

Ex.: Example
Comp. Ex.: Comparative Example
Note [1]EG: ethylene glycol
BPA-P: Addition product of bisphenol A with 4 moles of propylene oxide Effect of the invention:

The adherent polyester film of the present invention is characterized in that a composition having a specific amount of a sulfonic acid metal salt group in a polyester resin and comprising polyethylene oxide-monoalkyl ether or a mixture of the same and a polyethylene oxide-polypropylene oxide block copolymer in a specific ratio is used as a primer layer. Thereby, there is provided a polyester film having excellent heat resistance, high adhesion and low electrostatic properties and improved coating processabolity. Therefore, this film has excellent characteristics as a base film for a magnetic recording medium.

Figure 1:
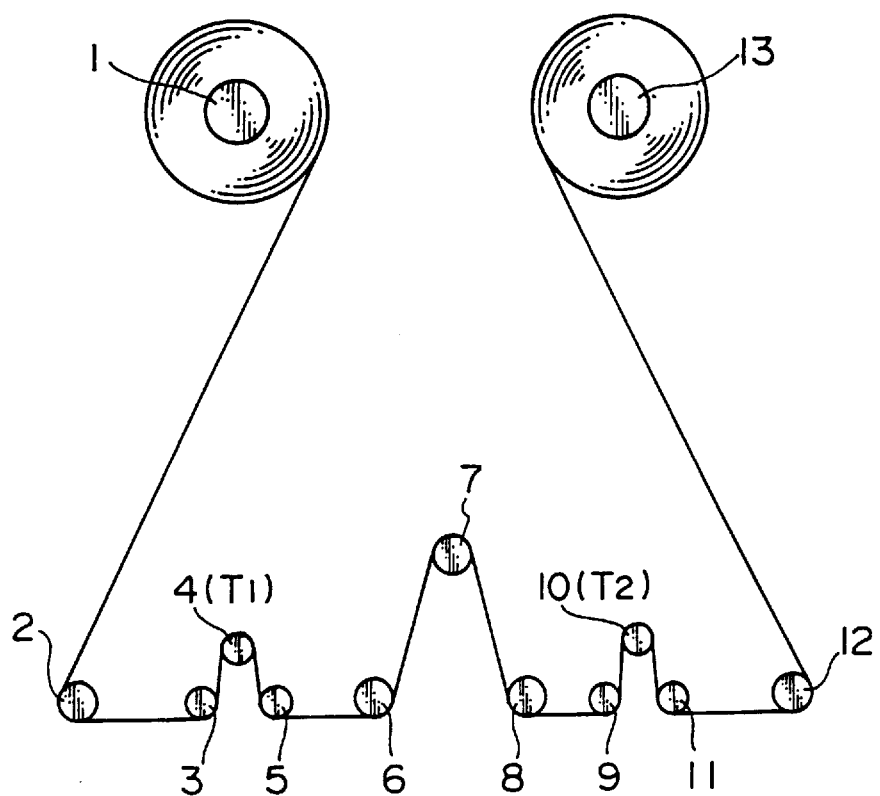
FIG. 1 is a diagram showing a typical device for measuring the running friction coefficient ($\mu k$) of the surface of a film.

1: an unwinding reel
2: a tension controller
3, 5, 6, 8, 9 and 11: free rollers
4: a tension tensiometer (inlet)
7: a fixed pin made of stainless steel SUS304
10: a tension tensiometer (outlet)
12: a guide roller
13: a take-up reel

What is claimed is:

1. A polyester film having low electrostatic and high adhesion properties and having formed on at least one side thereof a primer layer which has a softening point of 100° to 170° C. and consists essentially of component A and component B wherein component A is a water-dispersible polyester resin containing, as a copolymer component, a sulfonic acid metal salt group-containing compound in an amount of 0.04 to 0.3 mol % of the whole dicarboxylic acid compound, and wherein component B is
(i) a polyethylene oxide-monoalkyl ether, or
(ii) a mixture of a polyethylene oxide monoalkyl ether (i) and a polyethylene oxide-polypropylene oxide block copolymer wherein the weight ratio of (i) to (ii) is 10:0 to 2:8.

2. The polyester film of claim 1, wherein the primer layer contains component A in an amount of 93 to 70% by weight and component B in an amount of 7 to 30% by weight.

3. The polyester film of claim 1, wherein the monoalkyl ether of component B-1 in the primer layer has 8 to 18 carbon atoms in its alkyl moiety.

4. The polyester film of claim 1 or 4, wherein component B-1 in the primer layer has 3 to 15 ethylene oxide recurring units.

5. The polyester film of claim 1, wherein the component B-2 in the primer layer is a block copolymer comprising polyethylene oxide units and polypropylene oxide units in a weight ratio of 50:50 to 90:10.

6. The polyester film of claim 1, wherein the component B-2 in the primer layer is a polyethylene oxide-polypropylene oxide block copolymer having a number average molecular weight of 5,000 to 30,000.

7. The polyester film of claim 1, wherein component A in the primer layer is a water-dispersible polyester resin containing a 2,6-naphthalenedicarboxylic acid component in an amount of 30 to 100 mol % of the whole dicarboxylic acid compound.

8. The polyester film of claim 1, wherein the primer layer has a thickness of 0.005 to 1 $\mu$m.

9. The polyester film of claim 1, wherein the primer layer has a center line average surface roughness (Ra) of 0.002 to 0.02 $\mu$m.

10. The polyester film of claim 1, wherein the polyester film has a thickness of 3 to 20 $\mu$m.

11. The polyester film of claim 1, wherein the primer layer consists of component A and component B-1, the proportion of component A is 93 to 70% by weight and proportion of component B is 7 to 30% by weight, and the running friction coefficient at the time of heating at 65° C. and 105° C. is 0.05 to 0.75.

12. The polyester film of claim 1, wherein the primer layer consists essentially of component A and component B-1, proportion of the component A is 90 to 75% by weight and the proportion of the component B-1 is 10 to 25% by weight, and the running friction coefficient at the time of heating at 65° C. and 105° C. is 0.10 to 0.65.

13. The polyester film of claim 1, wherein (i) the primer layer consists essentially of component A, component B-1 and the component B-2, the proportion of component A is 93 to 80 % by weight, the proportion of component B-1 is 10 to 2% by weight, and the proportion of component B-2 is 15 to 5% by weight, and (ii) the primer layer has a softening point of 140° to 170° C.

14. The polyester film of claim 1, wherein (i) the primer layer consists essentially of component A, component B-1 and component B-2, the proportion of component A is 90 to 80% by weight, the proportion of component B-1 is 7 to 3% by weight, and the proportion of component B-2 is 13 to 7% by weight, and (ii) the primer layer has a softening point of 146° to 165° C.

15. The polyester film of claim 1 for use as a base film for a magnetic recording medium.

* * * * *